Aug. 7, 1956 R. ADLER 2,758,153

SUBSCRIPTION TELEVISION SYSTEM

Filed Aug. 22, 1951 4 Sheets-Sheet 1

INVENTOR:
ROBERT ADLER
BY Francis W. Crotty
HIS ATTORNEY.

Aug. 7, 1956 R. ADLER 2,758,153

SUBSCRIPTION TELEVISION SYSTEM

Filed Aug. 22, 1951 4 Sheets-Sheet 2

INVENTOR.
ROBERT ADLER
BY Francis W. Crotty
HIS ATTORNEY.

INVENTOR:
ROBERT ADLER
BY Francis W. Crotty
HIS ATTORNEY.

Aug. 7, 1956 R. ADLER 2,758,153

SUBSCRIPTION TELEVISION SYSTEM

Filed Aug. 22, 1951 4 Sheets-Sheet 4

INVENTOR:
ROBERT ADLER
BY Francis W. Crotty
HIS ATTORNEY.

2,758,153

SUBSCRIPTION TELEVISION SYSTEM

Robert Adler, Northfield, Ill., assignor to Zenith Radio Corporation, a corporation of Illinois Application August 22, 1951, Serial No. 243,039

3 Claims. (Cl. 178—5.1)

Figure 1:
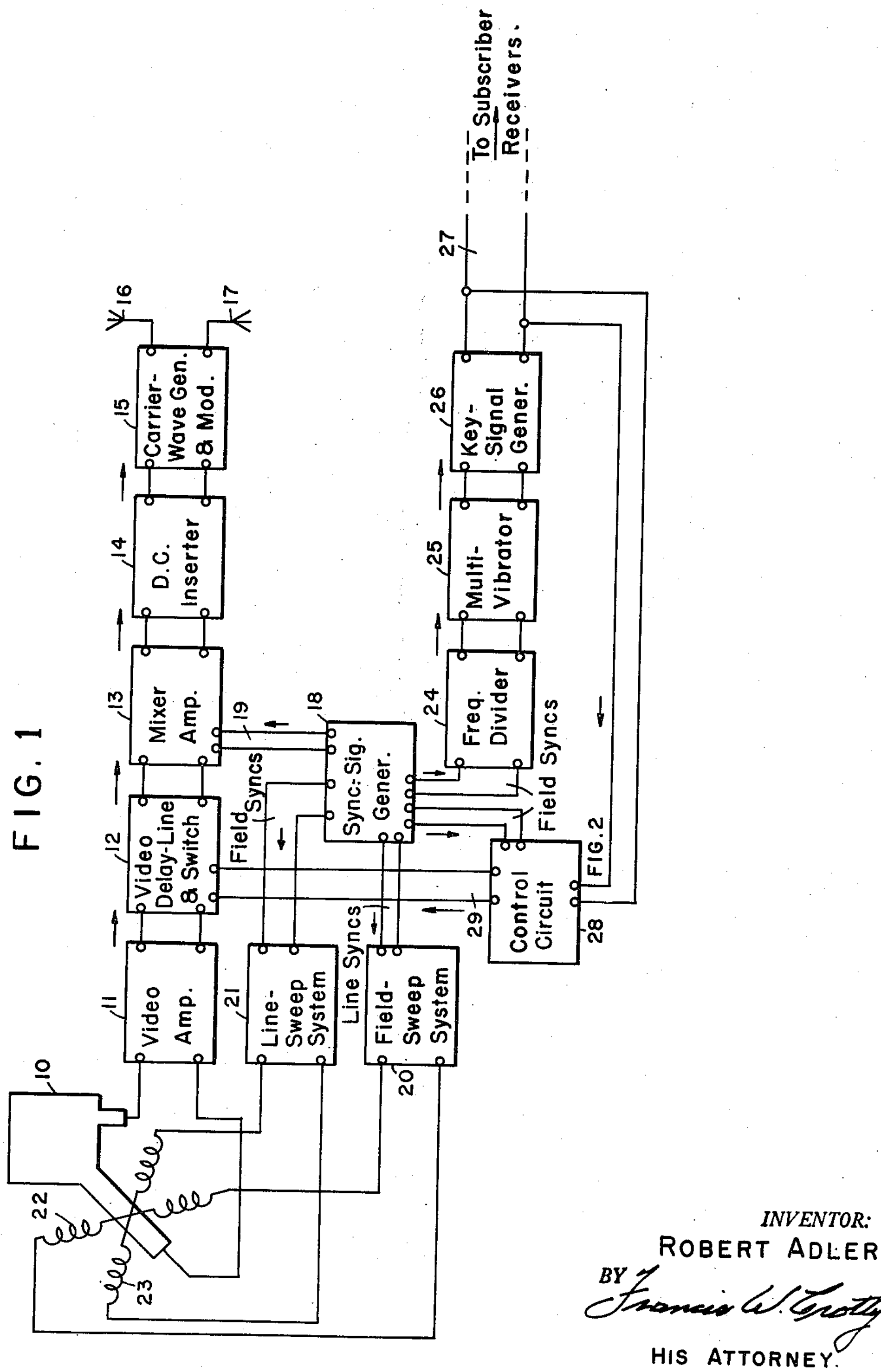

This invention relates to subscription television systems of the type in which a television signal is transmitted in coded form, and a key signal indicating the coding schedule of the television signal is made available at subscriber receivers, for example, by distribution over a signal channel such as a line circuit.

Patent 2,547,598, issued April 3, 1951, in the name of Erwin M. Roschke, entitled "Subscription, Image Transmission System and Apparatus" and assigned to the present assignee, discloses a subscription television system in which a radiated television signal is coded by varying the time relation of its video and synchronizing components during spaced intervals in accordance with a coding schedule. In such a system, a key signal indicating the coding schedule of the transmission may be distributed to subscriber receivers over a line circuit to enable them to decode and utilize the coded television signal. The timing variations between the video and synchronizing components of the television signal are produced by means of a delay line that is switched into the synchronizing portion of the scanning circuit of the transmitter picture tube during intervals determined by the coding schedule. In any interval in which the delay line is switched into the scanning system the synchronizing pulses applied to the deflection generator are delayed a selected amount with respect to corresponding synchronizing components included in the radiated television signal. This causes the video signal developed by the picture tube and, therefore, the video components of the television signal to be similarly delayed with respect to the aforementioned synchronizing components of the radiated signal. The television signal may, therefore, be considered to be effectively coded since the time relation of the video and synchronizing information is altered from time to time, whereas image reproduction in present-day commercial receivers requires an invariable timing between the video and synchronizing components of the received signal. The subscriber receivers developed to respond to the coded subscription telecast include apparatus which is actuated by the key signal for imparting a corresponding delay to the synchronizing pulses applied to the scanning system of its image-reproducing device and at the proper times effectively to decode the television signal.

Coding and decoding of the television signal may also be accomplished by selectively introducing a time delay in the video channel during spaced time intervals instead of varying the timing of the synchronizing components applied to the scanning systems of the picture tubes at the transmitter and receivers. More specifically, this may be achieved by an arrangement in which a video delay line is switched into the video channels of the transmitter and receivers during intervals determined by the coding schedule. Such an arrangement has certain advantages since it possesses inherent simplicity. At the transmitting end of the system, it permits the picture tube and its associated scanning circuits to be operated as a self-contained unit with its circuitry undisturbed by the coding apparatus. This unit may be situated at a point remote from the main transmitter, such as in a television studio, and the coding apparatus may conveniently be located at the main transmitter rather than in the studio as is sometimes necessary where coding is effected by varying the timing of the scansion of the picture tube. At the receiver, the incoming subscription signal may be effectively decoded without disturbing the scanning circuits of the receiver picture tube. This is of particular importance with respect to television receivers utilizing an automatic frequency controlled scanning circuit. Because of the composition of such a scanning circuit, certain problems are encountered when the decoding apparatus varies the timing of the sweep signal to compensate for variations in timing of the video and synchronizing components of the coded subscription signal. These problems are particularly pronounced where the frequency-control system is of this type in which a phase comparison of the synchronizing components is made with respect to the generated sweep signal.

Any arrangement for imparting a periodic delay to the video components directly for coding purposes must necessarily include a video delay line capable of imparting a selected delay to all the frequency components of the video signal without appreciable frequency distortion, and must also include a switching device capable of connecting the delay line into the transmitter or receiver circuit at the appropriate intervals without introducing amplitude or transient distortions.

Video delay lines exhibiting a substantially uniform delay to all the frequency components of the video signal normally utilized in television systems have recently been developed. A discussion of typical delay lines of this type may be found in Chapter 6 of "Components Notebook" by Blackburn, Massachusetts Institute of Technology, Radiation Laboratory Series No. 17, published by McGraw-Hill Publishing Company. Switching devices including a pair of grid controlled electron-discharge devices are known but it has been found that they are not satisfactory for switching the delay line into and out of the video channel, largely because of the practical difficulties in operating two such discharge devices with identical transfer characteristics for all brightness values of the video signal. It is not sufficient that they exhibit comparable characteristics at any particular operating point for, as is well known, the average value of the video signal varies continuously with changes in background illumination of the scene televised. Therefore, unless both the devices have identical characteristics throughout the entire operating range serious flicker problems arise as the delay line is switched in and out of the transmitter or receiver circuit. Even though such devices are constructed to have substantially similar characteristics during the beginning of a period of operation, it has been found that the characteristics vary slightly as the period progresses, producing the aforementioned flicker. A switch employing two electron-discharge devices may possibly be utilized in a transmitter where skilled personnel are available continually to maintain the devices adjusted properly. However, their use in subscriber receivers is quite impractical.

The present invention obviates these difficulties and permits a video delay line to be switched in and out of the transmitter or receiver of a subscription television system without the production of noticeable distortion or flicker.

It is, accordingly, an object of this invention to provide a subscription television system having an improved arrangement for accomplishing coding and decoding of a program signal.

A further object of the invention is to provide a subscription television system having an improved arrangement for coding or decoding a program signal by varying the timing of its video-frequency components in accordance with a prescribed coding schedule but without disturbing the scanning process of the picture converting devices utilized in the system.

Yet a further object of the invention is to provide a subscription television system in which coding of the program signal is effected in an improved and efficient fashion by the use of a minimum number of components.

In a subscription television system for translating a television signal including video-signal components and synchronizing-signal components, encoding arrangement in accordance with this invention comprises an electron-discharge device of the beam type including a source of electrons, means for forming the electrons from that source into an electron sheet beam, means for intensity modulating the beam, a plurality of beam-receiving electrodes, and deflection means for selectively directing the beam to the beam-receiving electrodes. An input circuit is coupled to the modulating means for impressing the video-signal components thereon and a control circuit is provided for applying a deflection signal to the deflecting means to direct the beam to one of the beam-receiving electrodes for certain time intervals and to direct the beam to another of the beam-receiving electrodes for other time intervals in accordance with a coding schedule. The arrangement includes an output terminal and means connecting the aforesaid one beam-receiving electrode to the terminal. Finally, additional means, including a video-signal delay-line, connects the other beam-receiving electrode to the output terminal so that the video-signal components as obtained at the terminal correspond to the impressed signal components but have a timing relative thereto that varies in accordance with the coding schedule.

Figure 2:
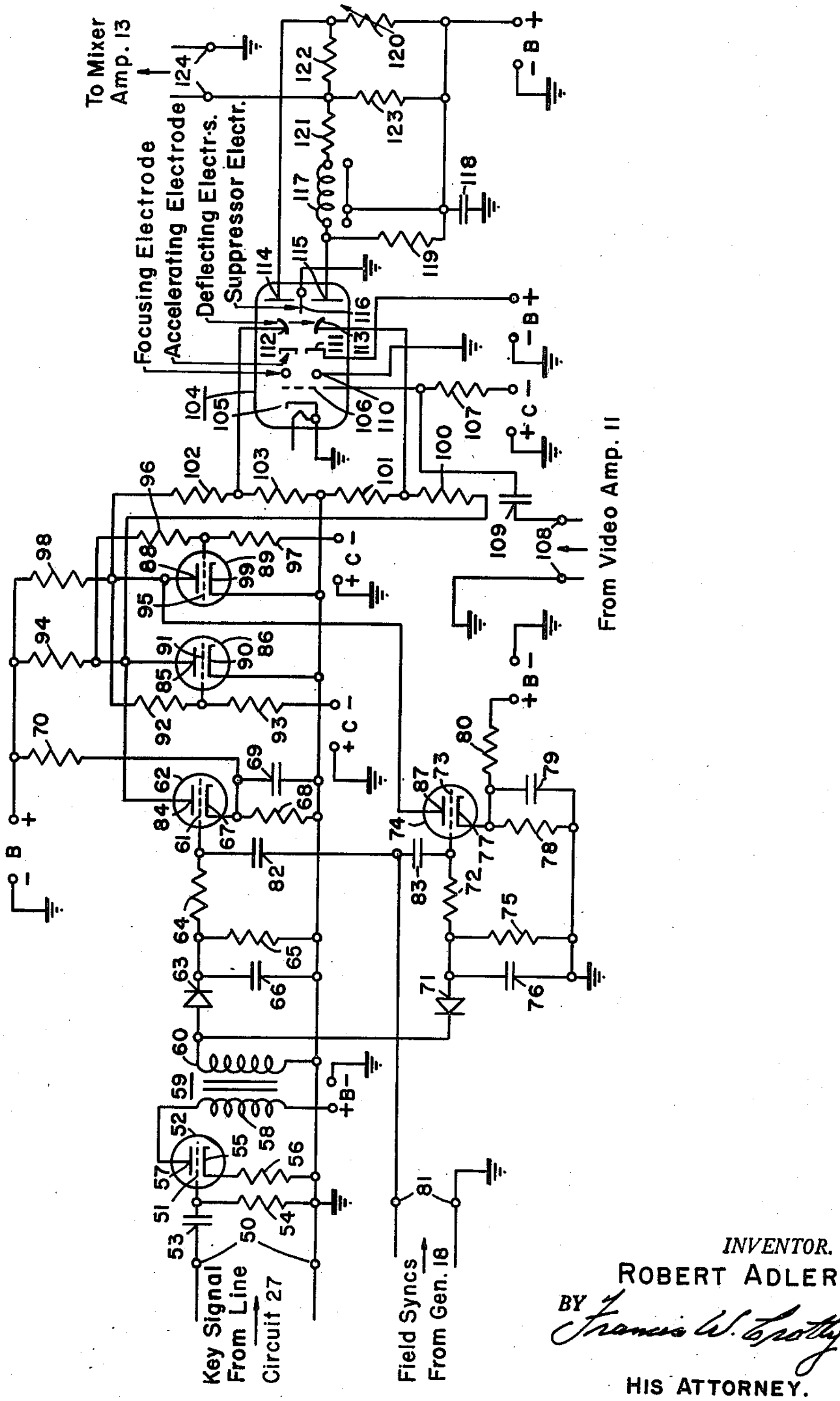
Figure 5:
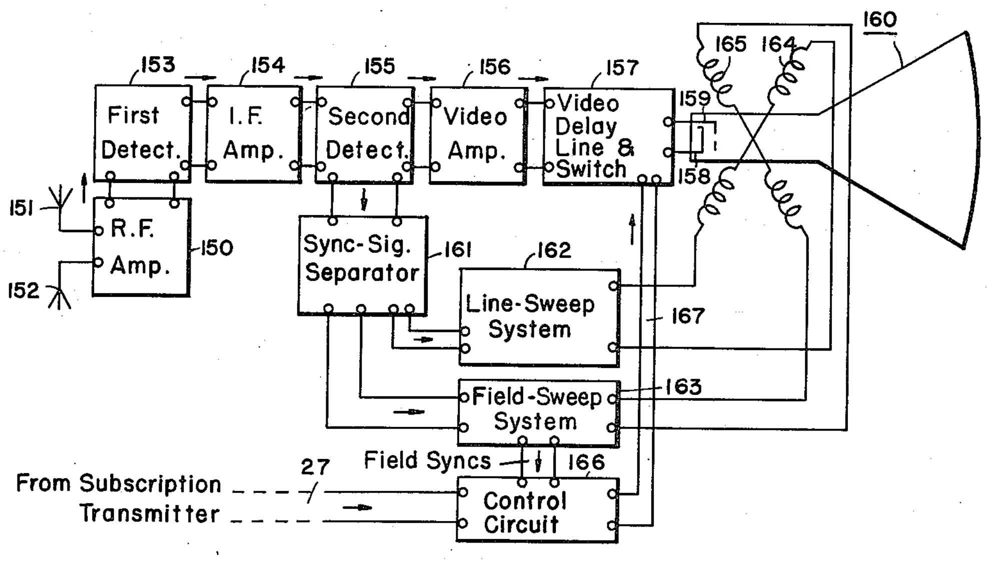
Figure 3:
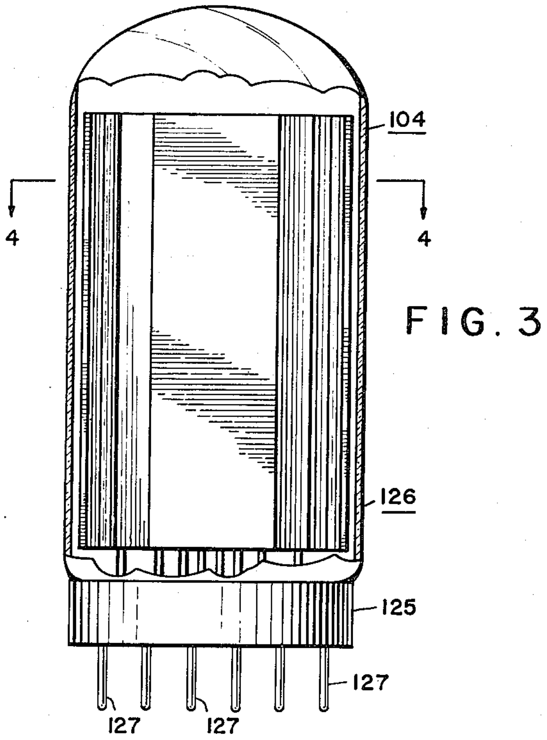
Figure 4:
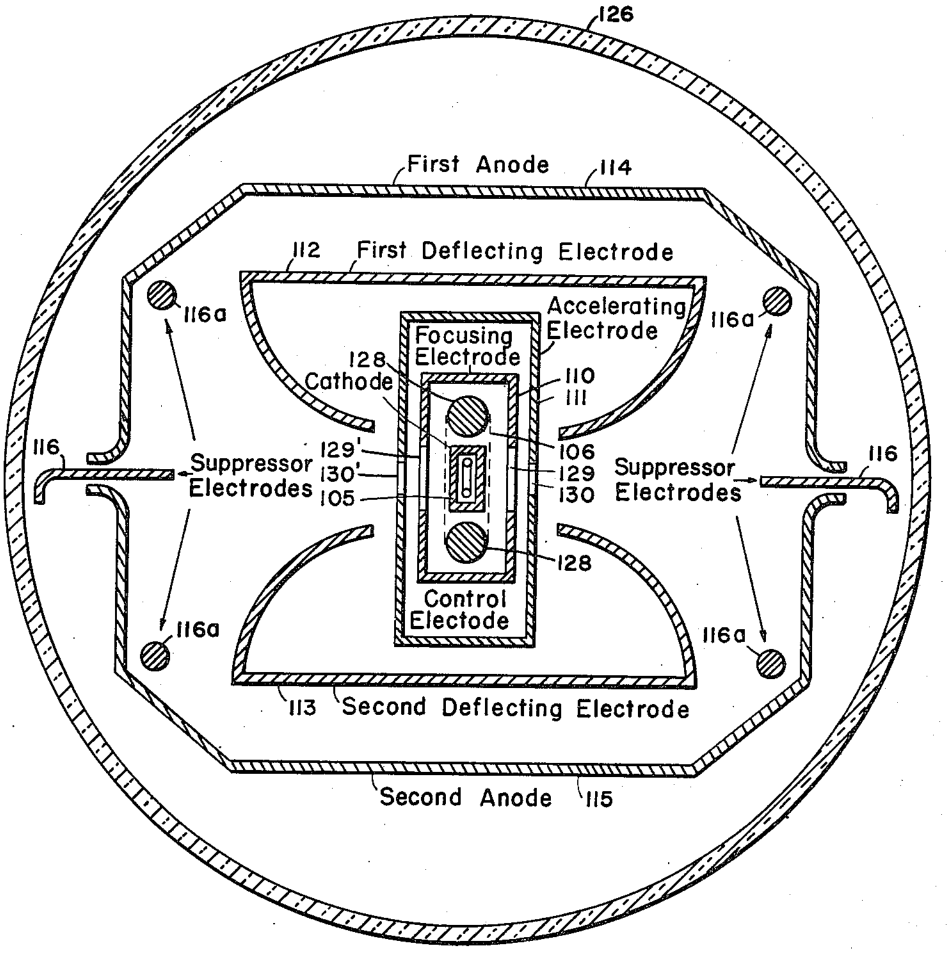

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows a subscription television transmitter incorporating the present invention, Figure 2 shows a coding device for use in the transmitter of Figure 1 and constructed in accordance with the invention, Figures 3 and 4 show one embodiment of a component of the invention, and, Figure 5 shows a television receiver utilizing the invention.

The transmitter of Figure 1 includes a picture-converting device 10 which may be an iconoscope, image-orthicon, image-dissector or any other well-known type. The output terminals of device 10 are connected to a video amplifier 11 of one or more stages which, in turn, is connected through a video-delay-line-and-switch 12 to a mixer amplifier 13. Unit 12 incorporates the present invention and is to be described in detail hereinafter in conjunction with Figure 2. Mixer amplifier 13 is connected through a direct-current inserter 14 to a carrier-wave generator and modulator 15 having output terminals connected to an appropriate antenna circuit 16, 17.

The transmitter includes a synchronizing-signal generator 18 which develops line- and field-synchronizing pulses, equalizing pulses, and associated pedestal pulses, and supplies them to mixer amplifier 13 over leads 19. Unit 18 also supplies field-synchronizing pulses to a field-sweep system 20 and line-synchronizing pulses to a line-sweep system 21. The output terminals of sweep systems 20 and 21 are connected respectively to the field-deflection elements 22 and line-deflection elements 23 of device 10.

Generating unit 18 also supplies field-synchronizing pulses to a frequency divider 24 which may be of the random type disclosed in copending application Serial No. 32,457, filed June 11, 1948, and issued March 11, 1952, as Patent 2,588,413, in the name of Erwin M. Roschke and assigned to the present assignee. The output terminals of frequency divider 24 are connected to a multivibrator 25 of the Eccles-Jordan type. That is, multivibrator 25 has two stable operating conditions and is triggered from one to the other by successive pulses from the frequency divider. The output terminals of multivibrator 25 are connected to a key-signal generator 26 which, in turn, is connected to a line circuit 27 extending to the subscriber receivers.

A control circuit 28, which may be similar to that described in copending application Serial No. 241,012 entitled "Subscription Television System," filed August 9, 1951, issued March 23, 1954, as Patent 2,673,239, in the name of Carl G. Eilers, and assigned to the present assignee, has input terminals connected to line circuit 27 and further input terminals connected to generating unit 18. The output terminals of control circuit 28 are connected to video-delay-line-and-switch 12 over leads 29. The control circuit 28 is also to be described in detail hereinafter in conjunction with Figure 2.

Picture-converting device 10 develops a video signal representing a subject scanned thereby, and this video signal is amplified in amplifier 11 and translated by unit 12 to mixer 13 wherein the synchronizing, equalizing and pedestal pulses derived from generating unit 18 are combined with the video components to produce a television signal at the output terminals of the mixer amplifier. The television signal is properly adjusted as to background level in inserter 14, modulated on a picture carrier in stage 15, and radiated from antenna 16, 17. The line- and field-scansions of device 10 are controlled respectively by sweep systems 21 and 20, which are synchronized with the line- and field-synchronizing components of the television signal by reason of their connection to generating unit 18.

Field-synchronizing pulses from unit 18 are frequency-divided in divider 24 which develops pulses at its output terminals coinciding with the field-synchronizing pulses but recurring at some random sub-multiple of the field-synchronizing frequency. These pulses trigger multivibrator 25, causing it to develop a signal having pulse components with leading and trailing edges respectively coinciding with the leading edges of successive pulses from frequency divider 24. The signal from multivibrator 25 is applied to key-signal generator 26 and turns on this generator for the duration of each of its pulse components of a given polarity, for example, the positive-polarity components, causing it to develop bursts of key signal on line circuit 27 during each such component. The key signal is distributed to the subscriber receivers over line circuit 27 to actuate decoding apparatus thereat and enable these receivers to decode and utilize the program signal radiated from the transmitter.

The bursts of key signal on line circuit 27 are also supplied to control circuit 28 which in response to these bursts and to field-synchronizing pulses from unit 18 produces on leads 29 a signal having pulse components corresponding to the bursts of key signal but initiated and terminated during field-retrace intervals following the beginning and ending of each key-signal burst. The control signal delivered over leads 29 actuates video-delay-line-and-switch 12 to insert the delay line into the video channel of the transmitter for the duration of each of the pulse components of the control signal. Since the leading and trailing edges of these pulse components occur during field-retrace intervals, the switching of the video-delay line in and out of the video channel always takes place during such retrace intervals and precludes distortions that could otherwise arise in the television signal were the switching operation to occur during trace intervals. Since the start and termination of each burst of key signal precede the actuation of delay-line-and-switch 12 by a selected amount, slight delays suffered by these bursts during their transmission over line circuit 27 have no adverse affect on the proper coincident operation of the coding apparatus at the transmitter (that is, control circuit 28 and delay-line-and-switch 12) in respect of corresponding decoding apparatus at each subscriber receiver.

In brief, during spaced operating intervals and in accordance with the coding schedule established by random frequency divider 24, bursts of key signal appear on line circuit 27. These bursts are applied to control circuit 28 which develops a control signal on leads 29 that is applied to video-delay-line-and-switch 12. The control signal has pulse components initiated and terminated during field-retrace intervals following the beginning and ending of each burst of key signal on line circuit 27. For the duration of each of these pulse components, video delay line 12 is switched into the video channel and the video components supplied to mixer 13 have a certain selected time delay. However, during the intervals between such pulse components the delay line is not included in the video channel and the video components experienced no unusual delay. Accordingly, the timing of the video components relative to the synchronizing components of the radiated program signal varies during spaced operating intervals as determined by the coding schedule, and these intervals as well as the coding schedule represented thereby are indicated to subscriber receivers by bursts of key signal on line circuit 27. The television signal is, therefore, effectively coded since it is not reproducible by conventional receivers, not equipped with suitable decoding apparatus, because such receivers require an invariable timing between the video and synchronizing components.

The control circuit 28, shown in detail in Figure 2, has input terminals 50 connected to line circuit 27, one of these terminals being grounded and the other coupled to the control electrode 51 of an electron-discharge device 52 through a coupling capacitor 53. Control electrode 51 is connected to ground through a grid-leak resistor 54 and the cathode 55 of device 52 is also connected to ground through a biasing resistor 56. The anode 57 of device 52 is connected to the positive terminal B+ of a source of unidirectional potential through the primary winding 58 of a transformer 59, the negative terminal of the unidirectional potential source being connected to ground. One side of the secondary winding 60 of transformer 59 is connected to ground and the other is connected to the control electrode 61 of an electron-discharge device 62 through a rectifier 63 and limiting resistor 64. The junction of rectifier 63 and resistor 64 is connected to ground through a resistor 65 shunted by a capacitor 66. Cathode 67 of device 62 is connected to ground through a resistor 68 shunted by a capacitor 69, and the cathode is further connected to the positive terminal B+ of a source of unidirectional potential through a resistor 70, the negative terminal of this source being connected to ground.

The ungrounded side of winding 60 is also connected through a rectifier 71 and limiting resistor 72 to the control electrode 73 of an electron-discharge device 74. The junction of rectifier 71 and resistor 72 is connected to ground through a resistor 75 shunted by a capacitor 76. The cathode 77 of device 74 is connected to ground through a resistor 78 shunted by a capacitor 79, and the cathode is further connected to the positive terminal B+ of a source of unidirectional potential through a resistor 80, the negative terminal of this source being connected to ground.

The control circuit includes a further pair of input terminals 81 connected to generator 18 to obtain field-synchronizing pulses therefrom. One of the terminals 81 is grounded and the other is coupled to the control electrodes 61 and 73 through capacitors 82 and 83 respectively.

The anode 84 of device 62 is connected to the anode 85 of an electron-discharge device 86, whereas the anode 87 of device 74 is connected to the anode 88 of an electron-discharge device 89. The cathode 90 of device 86 is connected to ground and the control electrode 91 of this device is connected to the anode 88 of device 89 through a resistor 92 and to the negative terminal C— of a biasing potential source through a resistor 93, the positive terminal of this source being grounded. Anode 85 of device 86 is connected to the positive terminal B+ through a resistor 94 and to the control electrode 95 of device 89 through a resistor 96. Control electrode 95 is connected to the negative terminal C— of a biasing potential source through a resistor 97, the positive terminal of this source being connected to ground. Anode 88 is further connected to the positive terminal B+ through a resistor 98, and the cathode 99 of device 89 is connected to ground. The anode 85 of device 86 is connected to ground through a pair of series-connected resistors 100, 101 and the anode 88 of device 89 is connected to ground through a pair of series connected resistors 102, 103.

When the afore-described key-signal bursts are applied to terminals 50, each burst is amplified in discharge device 52, and rectified in rectifiers 63 and 71 which are poled in an opposite sense relative to one another so that rectifier 63 produces a signal with positive-polarity pulse components corresponding to the key signal bursts while rectifier 71 produces a corresponding signal having negative-polarity pulse components. The signal developed by rectifier 63 is applied to control electrode 61 of tube 62 jointly with the positive field-synchronizing pulses received at terminals 81, and the signal produced by rectifier 71 is impressed on control electrode 73 of tube 74 along with the positive field-synchronizing pulses. The cathode 67 of device 62 has a forced positive bias impressed thereon by virtue of the potentiometer arrangement of resistors 68, 70. These resistors are given appropriate values to establish a bias threshold for device 62 such that the device translates the field-synchronizing pulses only during the intervals of the key signal rectified by rectifier 63. That is, only the field-synchronizing pulses occurring after the initiation and for the duration of each key-signal burst across terminals 50, are translated by device 62 and appear in the output circuit thereof with negative polarity. The rectified key-signal from rectifier 63 and the positive field-synchronizing pulses individually have insufficient amplitude to exceed the cathode bias of device 62.

Device 74, on the other hand, has a bias threshold established by resistors 78, 80 of such value that the positive field-synchronizing pulses alone exceed this threshold during the intervals between the negative polarity output pulses of rectifier 71 resulting from the rectification of the key signal. Therefore, field synchronizing pulses appear with negative polarity in the plate circuit of device 74 but only during intervals between the bursts of key signal.

Devices 86, 89 are connected as a multivibrator of the Eccles-Jordan type. That is, the multivibrator is triggered from a first stable operating condition to a second stable condition by negative pulses in the plate circuit of device 62 and is returned to the first condition by negative pulses in the plate circuit of device 74. The multivibrator develops a signal across resistors 102, 103 having negative pulse components whenever the multivibrator is in its second operating condition and develops a signal across resistors 100, 101 having positive pulse components occurring in time coincidence with the negative pulse components of the former signal. Therefore, assuming that the multivibrator is in its first operating condition wherein device 89 is predominantly conductive, the first negative field-synchronizing pulse appearing in the plate circuit of device 62 and following the initiation of a brust of key signal at terminals 50 triggers the multivibrator to its second operating condition wherein device 86 is predominantly conductive, but succeeding negative-polarity pulses from device 62 have no effect on the multivibrator as long as it is in its second condition. However, the next succeeding field-synchronizing pulse appearing in the plate circuit of device 74 returns the multivibrator to its first operating condition in which device 89 is predominantly conductive but succeeding pulses from device 74 have no effect on the multivibrator as long as it is in its first condition. The multivibrator, therefore, develops signals across resistors 102, 103 and 100, 101 respectively having positive and negative pulse components determined by the key-signal bursts applied to terminals 50. However, each pulse component of these signals is initiated by the field-synchronizing pulse following the beginning of a burst of key signal and is terminated by the field-synchronizing pulse following the termination of a key-signal burst. A series of bursts of key signal applied to input terminals 50 produces an output signal across resistors 102, 103 having a corresponding series of negative pulse components and an output signal across resistors 100, 101 having a corresponding series of positive pulse components. However, each pulse component of the output signal is displaced a selected amount from the corresponding bursts and begins and ends during the succeeding field-retrace intervals as required for the proper operation of the control circuit in the transmitter of Figure 1.

The video-delay-line-and-switch 12 of Figure 2 comprises an electron-discharge device 104 of the beam type including a cathode 105 which may be considered a source of electrons. Device 104 also includes means 110, 111 for forming electrons from the source into an electron beam. Device 104 further includes a control electrode 106 for modulating the intensity of the electron beam in accordance with the signal impressed thereon. Control electrode 106 is connected to the negative terminal C— of a biasing potential source through resistor 107, the positive terminal of this source being connected to ground. The control electrode is coupled to one of the pair of input terminals 108 through a capacitor 109, the other terminal being connected to ground and these terminals being connected to video amplifier 11 of Figure 1. When capacitor 109 is employed the direct-current components of the television signal may be inserted at a subsequent stage, as in unit 14 of Figure 1. However, when desired, device 104 may translate these direct-current components in which case capacitor 109 is omitted.

Element 110 of device 104 is a focusing electrode which may be connected to ground, and element 111 is an accelerating electrode connected to the positive terminal B+ of a source of unidirectional potential, the negative terminal of this source being connected to ground. The junctions of resistors 102, 103 and of resistors 100, 101 are connected to the deflecting electrodes 112, 113 of device 104. Deflecting electrodes 112, 113 provide electrostatic deflection within the device. It is apparent that these electrodes may be replaced by suitable electro-magnetic deflecting means connected to the control circuit to perform the deflecting functions. The device further includes a pair of beam-receiving or anode electrodes 114, 115 which have a suppressor electrode 116 interposed therebetween, the suppressor being connected to ground.

Beam-receiving electrode 115 is connected to the positive terminal B+ of a source of unidirectional potential through a resistor 119, and electrode 114 is connected to this terminal through a variable resistor 120, the negative terminal of this source being grounded and the positive terminal thereof being by-passed to ground through a capacitor 118. Electrode 115 is further connected to one input terminal of a video-delay line 117 which may be one of the types discussed in the publication referred to previously herein, exhibiting a substantially linear phase shift-frequency characteristic for the frequency components of the video signal to be translated. One output terminal of delay line 117 is connected to electrode 114 through a pair of series-connected resistors 121, 122 whose junction is connected to one of a pair of output terminals 124. The other input and output terminals of delay line 117 are connected to the positive terminal B+, and the junction of resistors 121, 122 is connected to this positive terminal through a resistor 123. The other output terminal 124 is connected to ground, and these output terminals are connected to mixer 13 of Figure 1.

The video signal from amplifier 11 modulates the electron beam developed in discharge device 104, and this beam is directed to either electrode 114 or to electrode 115 under the influence of the control signals produced by the previously-described control circuit and applied to deflecting electrodes 112, 113. That is, whenever a burst of key signal appears on line circuit 27, the control signal applied to deflecting electrode 112 has a negative pulse component beginning and ending during the field-retrace intervals following the initiation and termination of the burst, and the control signal applied to deflecting electrode 113 has a positive pulse component in time coincidence with the negative pulse component of the first-mentioned control signal. For the duration of such pulse components the electron beam in device 104 is deflected by the deflecting electrodes to beam-receiving electrode 115. During the intervals when the beam is so directed the video signal is applied to output terminals 124 through delay line 117 and appears thereacross in delayed condition. However, during intervals intermediate the key-signal bursts the electron beam is directed to beam-receiving electrode 114 and, during such intervals, the video signal is supplied undelayed to output terminals 124. Resistors 121, 122 and 123, in conjunction with variable resistor 120, form a pi network used for equalizing the amplitude of the video signal in its delayed and undelayed states. That is, since the undelayed video signal applied to output terminals 124 from electrode 114 passes through the pi network, its amplitude can be controlled to correspond precisely with the amplitude of the delayed video signal and compensate for any attenuation suffered by the latter during its translation by the delay line. The pi network may also include inductive and capacitive impedances to compensate in well-known manner for frequency-selective attenuation produced in the delay line.

The control circuit and video delay line and switch of Figure 2 responds, therefore, to the bursts of key signal and the field-synchronizing pulses to control the video signal so that during the intervals corresponding to the bursts of key signal on line circuit 27 the video signal is translated thereby with a preselected time delay. On the other hand, during intermediate intervals the video signal is translated with no appreciable time delay.

A preferred construction for discharge device 104 is shown in Figures 3 and 4, Figure 3 showing an elevational view of the device and Figure 4 representing an enlarged cross-sectional view taken along the lines 4—4 of Figure 3. The device includes a base 125 and an enclosing envelope 126. Base 125 supports a plurality of pins 127 connected to electrodes within the device and arranged in well-known manner. As shown in Figure 4, cathode 105 is positioned centrally within the device and is surrounded by concentrically-arranged control electrode 106, focusing electrode 110, and accelerating electrode 111. The deflecting electrodes 112, 113 are mounted in the illustrated fashion, and are surrounded by the anodes or beam receiving electrodes 114, 115. Suppressor electrodes 116 are mounted between the extremities of the anodes, and further suppressor electrodes 116a of cylindrical shape may be provided in the illustrated positions if so desired. The various electrodes are supported in well-known manner and are connected to corresponding pins 127 in the tube base.

The illustrated construction of device 104 is such that a pair of electron beams is developed therein for optimum efficiency. However, it is apparent that the switching function of this device can be performed with but a single beam. The electron beams in device 104 are focussed by electrode 110 and accelerated by electrode 111 to the anodes 114 or 115 through apertures 129, 130 and 129', 130' in these electrodes. The intensity of the beam is controlled by the modulating signal applied to control electrode 106, as previously described. The control electrode in the illustrated embodimentt is a conventional parallel-plane grid wound, for example, with approximately 90 turns to the inch.

In a constructed embodiment of the invention utilizing a discharge device similar to that shown in Figures 3 and 4, the following operating potentials were used, and these potentials are listed herein merely by way of example:

Cathode 105: Ground potential
Control electrode 106: −2 v.±modulating potential
Focusing electrode 110: Ground potential
Accelerating electrode 111: +180 v.
Deflecting electrodes 112, 113: +40 v.±control signal (25 v.)
Anode electrodes 114, 115: +300 v.
Suppressor electrodes 116, 116a: Ground potential The illustrated device is capable of developing a total beam current ranging from 0 to 20 milliamps. in response to the video modulations, the average being around 12 milliamps. In the switching arrangement of Figure 2, the electron beam in device 104 is modulated in accordance with the video signal and is directed sequentially to the beam-receiving electrodes to produce the required periodic delay of the video signal. Therefore, the previously discussed problem of producing a pair of devices having identical transfer characteristics for all brightness values of the video signal does not arise. The discharge device used in the above circuit exhibits by its very nature identical transfer characteristics regardless of whether the beam is directed to one or the other of the electrodes and for this reason, the aforementioned deleterious flicker does not occur in the video signal as its timing varies from the undelayed to the delayed condition. That is, the image intelligence represented by the video signal, including the background information, is translated faithfully to the output terminals 124 for all modes of operation of the circuit.

The receiver of Figure 5 includes a radio-frequency amplifier 150 having input terminals connected to an antenna 151, 152 and output terminals connected to a first detector 153. The first detector is coupled through an intermediate-frequency amplifier 154 to a second detector 155 which, in turn, is connected to a video amplifier 156. The output terminals of video amplifier 156 are connected through a video delay line and switch 157 to the input electrodes 158, 159 of a cathode-ray image reproducing device 160. The unit 157 may be similar in construction to video delay line and switch 12 of Figure 1 which has been described in conjunction with Figure 2.

Second detector 155 is also connected to a synchronizing-signal separator 161 having output terminals connected to a line-sweep system 162 and field-sweep system 163. The sweep systems are connected respectively to the line-deflection elements 164 and field-deflection elements 165 associated with device 160.

The receiver also includes a control circuit 166 having a first pair of input terminals connected to the line circuit 27 extending from the subscription transmitter, and a second pair of input terminals connected to field-sweep system 163 to derive field synchronizing pulses therefrom. The output terminals of control circuit 166 are connected to video delay line and switch 157 by leads 167.

The television signal from the transmitter of Figure 1 may be intercepted by antenna 151, 152 and amplified in radio-frequency amplifier 150. The amplified signal from amplifier 150 is heterodyned to the selected intermediate frequency of the receiver in first detector 153, and the resulting intermediate-frequency signal is amplified in intermediate-frequency amplifier 154 and detected in second detector 155 to produce a composite video signal. The video signal is amplified in video amplifier 156 and impressed on input electrodes 158, 159 of reproducing device 160 through video delay line and switch 157. The video signal impressed on the input electrodes of the reproducing device controls the intensity of the cathode-ray beam therein in accordance with the image intelligence as is well known.

The synchronizing components of the received television signal are separated out in synchronizing-signal separator 161 and utilized to synchronize sweep systems 162, 163, and thus the line- and field-scansion of device 160, at the line- and field-scanning frequencies of the system.

Control circuit 166 operates in a manner similar to control circuit 28 at the transmitter to supply a control signal over leads 167 to video delay line and switch 157, the control signal having pulse components initiated and terminated during field-retrace intervals following the beginning and ending of each key-signal burst on line circuit 27. Video delay line and switch 157 may be similar to unit 12 at the transmitter, with the exception that it operates to switch the video delay line into the receiver circuit during the intervals when the video delay line at the transmitter is switched out of the transmitter circuit. This inverted operation of unit 157 may be effected by reversing the connections to deflecting electrodes 112, 113 of device 104 in the circuit of Figure 2. In this manner, the video signal impressed on electrodes 158, 159 of reproducing device 160 has an invariable timing relative to the synchronizing components as is required for proper reproduction of the video information by this device. If desired, the key-signal representing the coding schedule of the transmitter may be locally generated at the receiver.

In the illustrated system video delay line 12 at the transmitter and video delay line 157 at the receiver are shown to be switched in and out of the transmitter and receiver circuits at a rate that is some sub-multiple of the field-synchronizing frequency. For example, delay line and switch 12 is controlled by pulses from control circuit 28, and the occurrence of these pulses is determined by the frequency divided field-synchronizing pulses from divider 24. It is of course within the realms of the invention that the above-mentioned delay line be controlled at a higher-than-field rate, for example by some sub-multiple of the line-synchronizing frequency. In such an embodiment it is merely necessary to supply line-synchronizing pulses instead of field-synchronizing pulses to frequency divider 24 and control circuit 28.

This invention provides, therefore, a subscription television system in which coding and decoding of a television signal is achieved in an improved and simplified fashion. That is, the coding and decoding is accomplished by varying the time relation between various components of the program signal in an expeditious manner without disturbing the scanning circuits of the picture-converting devices used in the system.

While a particular embodiment of the invention has been shown and described, modifications may be made, and it is intended in the appended claims to cover all such modifications as may fall within the true spirit and scope of the invention.

I claim:

1. In a subscription television system for translating a television signal including video-signal components and synchronizing-signal components, an encoding arrangement comprising: an electron-discharge device of the beam type including, a source of electrons, means for forming electrons from said source into an electron sheet beam, means for intensity modulating said beam, a plurality of beam-receiving electrodes, and deflecting means for selectively directing said beam to said beam-receiving electrodes; an input circuit for impressing said video-signal components on said modulating means; a control circuit for applying a deflection signal to said deflecting means to direct said beam to one of said beam-receiving electrodes for certain time intervals and to direct said beam to another of said beam-receiving electrodes for other time intervals in accordance with a coding schedule; an output terminal; means connecting said one beam-receiving electrode to said terminal; and means including a video-signal delay line connecting said other beam-receiving electrode to said terminal so that the video-signal components obtained at said terminal correspond to said impressed video-signal components but have a timing relative thereto that varies in acordance with said coding schedule.

2. In a subscription television system for translating a television signal including video-signal components and synchronizing-signal components, an encoding arrangement comprising: an electron discharge device of the beam type including a source of electrons, means for forming electrons from said source into an electron sheet beam, means for intensity modulating said beam, a plurality of beam receiving electrodes, and deflecting means for selectively directing said beam to said beam receiving electrodes; an input circuit for impressing said video-signal components on said modulating means; a control circuit for applying a deflection signal to said deflecting means to direct said beam to one of said beam receiving electrodes for certain time intervals and to direct said beam to another of said beam receiving electrodes for other time intervals in accordance with a coding schedule, an output terminal; means including a video signal delay line connecting said one beam receiving electrode to said terminal; and means including an equalizing network connecting said other beam receiving electrode to said terminal so that the video-signal components obtained at said terminal are equalized in amplitude during all of said intervals and correspond to said impressed video-signal components but have a timing relative thereto that varies in accordance with said coding schedule.

3. In a subscription television system for translating a television signal including video-signal components and synchronizing-signal components, an encoding arrangement comprising: an electron-discharge device of the beam type including, a source of electrons, means for forming electrons from said source into an electron sheet beam, means for intensity modulating said beam, a plurality of beam-receiving electrodes, and deflecting means for selectively directing said beam to said beam-receiving electrodes; an input circuit for impressing said video-signal components on said modulating means; a control circuit for applying a deflection signal to said deflecting means to direct said beam to one of said beam-receiving electrodes for certain time intervals and to direct said beam to another of said beam-receiving electrodes for other time intervals in accordance with a coding schedule; an output terminal; means connecting said one beam-receiving electrode to said terminal; and means, including a video signal delay line having a substantially linear phase shift characteristic for all frequency components of said impressed signal, connecting said other beam receiving electrode to said terminal so that the video-signal components obtained at said terminal correspond to said impressed video-signal components but have a timing relative thereto that varies in accordance with said coding schedule.

References Cited in the file of this patent

UNITED STATES PATENTS

| | | |
|---|---|---|
| 2,390,250 | Hansell | Dec. 4, 1945 |
| 2,517,808 | Sziklai | Aug. 8, 1950 |
| 2,539,556 | Steinberg | Jan. 30, 1951 |
| 2,570,188 | Aram et al. | Oct. 9, 1951 |